(12) United States Patent
Kumazaki

(10) Patent No.: US 12,735,062 B2
(45) Date of Patent: Sep. 15, 2026

(54) DISPLAY CONTROL DEVICE, DISPLAY CONTROL METHOD, AND COMPUTER PROGRAM FOR DISPLAY CONTROL

(71) Applicant: TOYOTA JIDOSHA KABUSHIKI KAISHA, Toyota (JP)

(72) Inventor: Kenta Kumazaki, Bunkyo-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/204,716

(22) Filed: May 12, 2025

(65) Prior Publication Data

US 2025/0353517 A1 Nov. 20, 2025

(30) Foreign Application Priority Data

May 17, 2024 (JP) ................................ 2024-081042

(51) Int. Cl.

| | |
|---|---|
| ***B60W 30/16*** | (2020.01) |
| ***B60L 15/20*** | (2006.01) |
| ***B60W 50/00*** | (2006.01) |
| ***B60W 50/14*** | (2020.01) |

(52) U.S. Cl.

CPC ......... *B60W 50/14* (2013.01); *B60L 15/2009* (2013.01); *B60W 30/16* (2013.01); *B60W 50/0097* (2013.01); *B60L 2240/16* (2013.01); *B60L 2250/16* (2013.01); *B60L 2250/28* (2013.01); *B60W 2510/242* (2013.01); *B60W 2540/10* (2013.01); *B60W 2540/30* (2013.01); *B60W 2554/4041* (2020.02); *B60W 2554/802* (2020.02); *B60W 2720/106* (2013.01)

(58) Field of Classification Search

None

See application file for complete search history.

(56) References Cited

U.S. PATENT DOCUMENTS

| | | | | |
|---|---|---|---|---|
| 2020/0361479 | A1 | 11/2020 | Hirasawa et al. | |
| 2021/0276556 | A1* | 9/2021 | Hansen | B60K 35/22 |
| 2022/0388399 | A1* | 12/2022 | Tomida | B60K 35/22 |
| 2023/0104698 | A1* | 4/2023 | Young | E02F 9/207 701/22 |
| 2024/0017736 | A1 | 1/2024 | Kume et al. | |
| 2024/0359681 | A1* | 10/2024 | Obayashi | B60K 6/48 |

FOREIGN PATENT DOCUMENTS

| | | | |
|---|---|---|---|
| JP | 2012-147592 | A | 8/2012 |
| JP | 2020-185864 | A | 11/2020 |
| JP | 2022-141419 | A | 9/2022 |

* cited by examiner

*Primary Examiner* — James M McPherson

(74) *Attorney, Agent, or Firm* — Dinsmore & Shohl LLP

(57) ABSTRACT

A display control device includes a processor configured to: determine whether or not a state of a battery of a vehicle satisfies a predetermined limit condition, notify a driver of the vehicle of an output limit warning in which output of a motor mounted on the vehicle is limited when the state of the battery satisfies the limit condition via a notification device mounted on the vehicle, and set the limit condition to a first condition when an acceleration/deceleration control mode for controlling acceleration/deceleration of the vehicle in accordance with a distance between a preceding vehicle and the vehicle is not applied, and set the limit condition to a second condition that is more strict than the first condition when the acceleration/deceleration control mode is applied.

4 Claims, 4 Drawing Sheets

TO IN-VEHICLE NETWORK
COMMUNICATION INTERFACE
MEMORY
PROCESSOR
ECU
16
21
22
23
10
11
12
13
14
15
16

FIG. 2

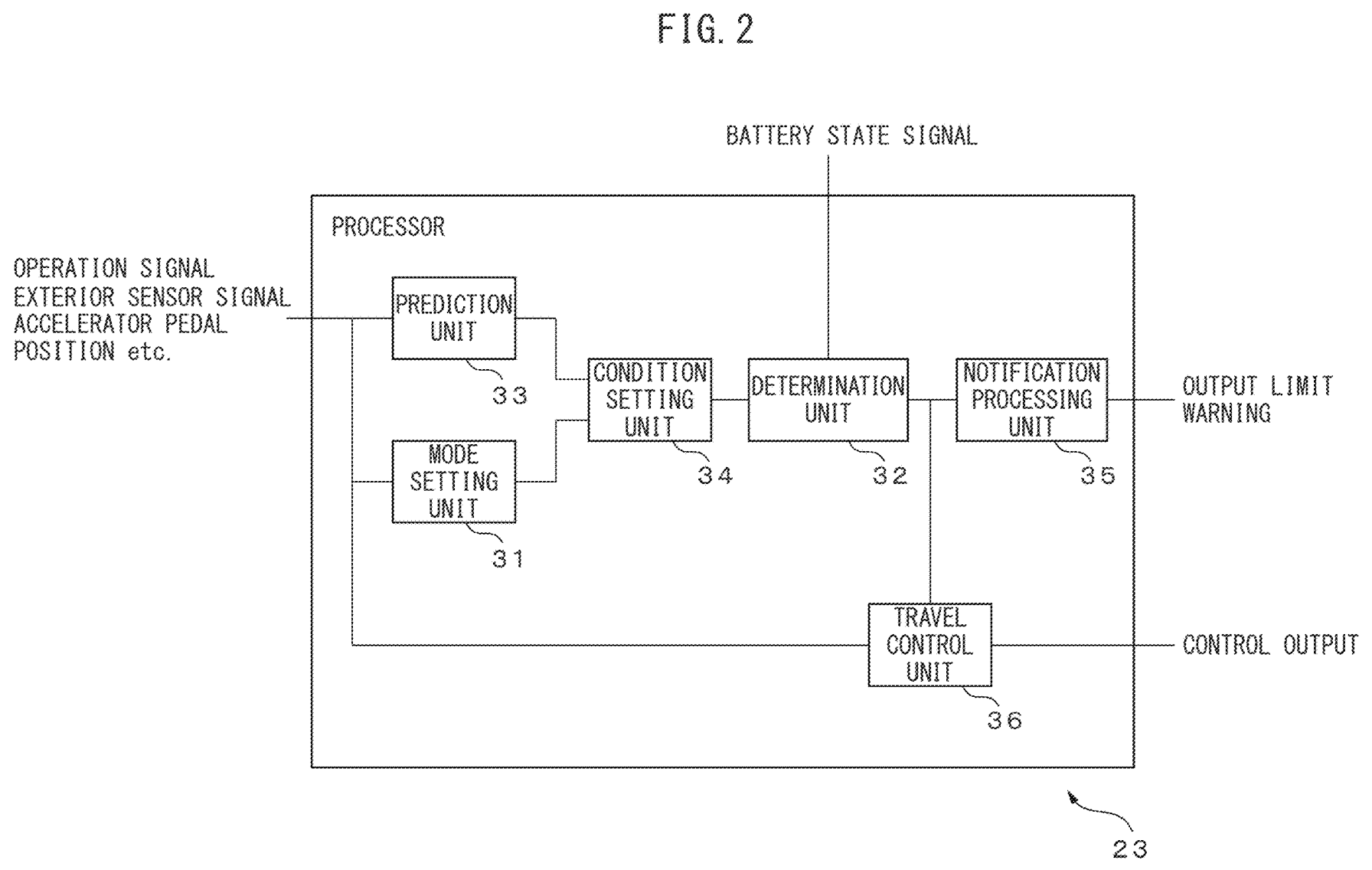

OUTPUT LIMIT WARNING

CONTROL OUTPUT

23

PROCESSOR

NOTIFICATION PROCESSING UNIT 35

TRAVEL CONTROL UNIT 36

DETERMINATION UNIT 32

BATTERY STATE SIGNAL

CONDITION SETTING UNIT 34

PREDICTION UNIT 33

MODE SETTING UNIT 31

OPERATION SIGNAL
EXTERIOR SENSOR SIGNAL
ACCELERATOR PEDAL POSITION etc.

DISPLAY CONTROL DEVICE, DISPLAY CONTROL METHOD, AND COMPUTER PROGRAM FOR DISPLAY CONTROL

CROSS-REFERENCE TO RELATED APPLICATIONS

This application claims priority to Japanese Patent Application No. 2024-081042 filed May 17, 2024, the entire contents of which are herein incorporated by reference.

FIELD

The present disclosure relates to a display control device, a display control method, and a display control computer program for controlling notification of a state of a vehicle.

BACKGROUND

In order to increase the cruising distance of an electric vehicle, a technique has been proposed in which, when the remaining amount of a battery is smaller than a predetermined amount, the request power of a driving motor is limited, and the restricted state is displayed on a warning display device (see Japanese Unexamined Patent Publication JP2012-147592A).

SUMMARY

In a case where a driving mode in which the acceleration/deceleration of a vehicle is automatically controlled in accordance with a distance between the vehicle and the preceding vehicle thereof is applied to the vehicle, there are few situations in which it is required to supply a relatively large amount of electric power to a motor, such as a situation in which rapid acceleration is required. Therefore, when the warning notification regarding a restricted state for a request power is displayed during the application of the driving mode, the traveling control of the vehicle in which the restriction is applied to the vehicle is not actually executed, so that there is a possibility that a driver of the vehicle may be worried that some abnormality has occurred in the vehicle control system.

Therefore, it is an object of the present disclosure to provide a display control device capable of reducing the frequency of a notification for causing a driver of a vehicle to feel anxiety.

A display control device according to an embodiment includes a processor configured to: determine whether or not a state of a battery of a vehicle satisfies a predetermined limit condition, notify a driver of the vehicle of an output limit warning in which output of a motor mounted on the vehicle is limited via a notification device mounted on the vehicle, when the state of the battery satisfies the limit condition, set the limit condition to a first condition when an acceleration/deceleration control mode for controlling acceleration/deceleration of the vehicle in accordance with a distance between a preceding vehicle and the vehicle is not applied, and set the limit condition to a second condition that is more strict than the first condition when the acceleration/deceleration control mode is applied.

In one embodiment, the processor of the display control device is further configured to determine whether or not a prediction condition in which execution of an accelerator operation by the driver is expected is satisfied based on a traveling state of another vehicle traveling around the vehicle, a distance between the other vehicle and the vehicle, or a behavior of the driver, wherein when the prediction condition is satisfied, the processor sets the limit condition to the first condition even if the acceleration/deceleration control mode is applied.

A display control method according to another embodiment includes: determining whether or not a state of a battery of a vehicle satisfies a predetermined limit condition; notifying a driver of the vehicle of an output limit warning in which output of a motor mounted on the vehicle is limited via a notification device mounted on the vehicle, when the state of the battery satisfies the limit condition; setting the limit condition to a first condition when an acceleration/deceleration control mode for controlling acceleration/deceleration of the vehicle in accordance with a distance between a preceding vehicle and the vehicle is not applied, and setting the limit condition to a second condition that is more strict than the first condition when the acceleration/deceleration control mode is applied.

A non-transitory recording medium that stores a display control computer program according to still another embodiment including instructions causing a processor mounted on a vehicle to execute a process including: determining whether or not a state of a battery of the vehicle satisfies a predetermined limit condition; notifying a driver of the vehicle of an output limit warning in which output of a motor mounted on the vehicle is limited via a notification device mounted on the vehicle, when the state of the battery satisfies the limit condition; setting the limit condition to a first condition when an acceleration/deceleration control mode for controlling acceleration/deceleration of the vehicle in accordance with a distance between a preceding vehicle and the vehicle is not applied, and setting the limit condition to a second condition that is more strict than the first condition when the acceleration/deceleration control mode is applied.

The display control device according to the present disclosure has an effect of reducing the frequency of a notification for causing a driver of a vehicle to feel anxiety.

BRIEF DESCRIPTION OF DRAWINGS

FIG. 2 is a functional block diagram of a processor of an electronic control unit related to a display control process.

DESCRIPTION OF EMBODIMENTS

Hereinafter, a display control device, a display control method executed on the display control device, and a display control computer program will be described with reference to the drawings. When a battery state of a vehicle satisfies a predetermined limit condition, the display control device notifies a driver of the vehicle of an output limit warning indicating that the output of a motor mounted on the vehicle is limited via a notification device mounted on the vehicle. Further, the display control device sets the limit condition when a driving mode for controlling acceleration/deceleration of the vehicle in accordance with a distance between the vehicle and a preceding vehicle thereof is not applied to the vehicle (hereinafter, referred to as an acceleration/deceleration control mode) to a first condition, and sets the limit condition when the acceleration/deceleration control mode is applied to the vehicle to a second condition that is more strict than the first condition.

Figure 1:
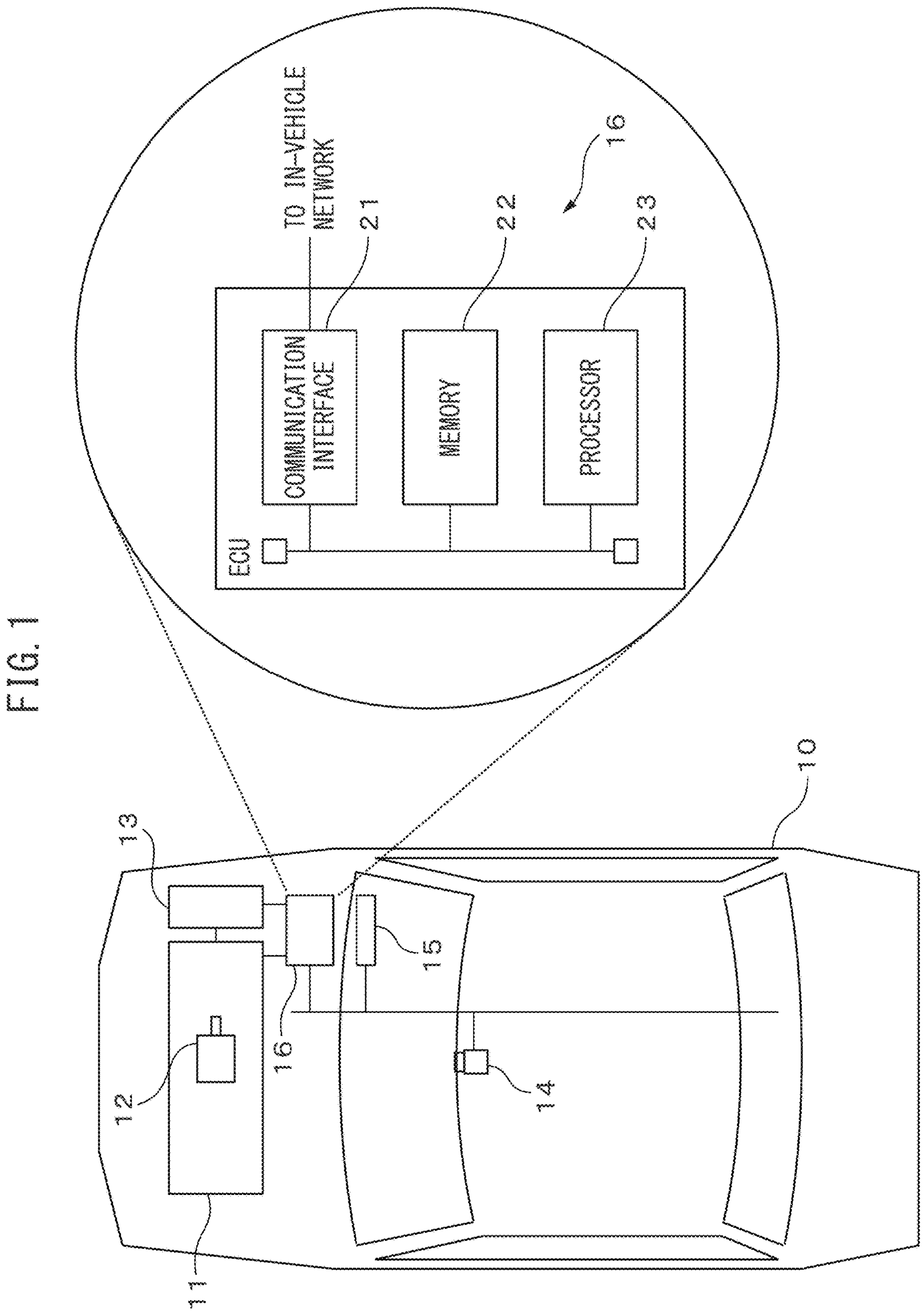
FIG. 1 schematically illustrates the configuration of a vehicle equipped with a display control device.

FIG. 1 schematically illustrates the configuration of a vehicle equipped with a display control device. In the present embodiment, a vehicle 10 is a battery electric vehicle, hybrid, or plug-in hybrid type vehicle, and a powertrain 11 of the vehicle 10 includes a motor 12 as a driving power source. Further, the vehicle 10 includes a battery 13 for supplying electric power to each unit of the vehicle 10, an exterior sensor 14, a notification device 15, and an electronic control unit (ECU) 16.

The exterior sensor 14 is a sensor that generates an exterior sensor signal representing a situation around the vehicle 10, and is, for example, a camera that is provided so as to be capable of capturing an image of the surroundings of the vehicle 10, or a range sensor such as a LiDAR or a radar. The vehicle 10 may be provided with a plurality of exterior sensors 14 having different detectable ranges or types. Each time the exterior sensor signal is generated, the exterior sensor 14 outputs the generated exterior sensor signal to the ECU 16.

The notification device 15 is an example of a notification unit and is provided in a vehicle interior of the vehicle 10. The notification device 15 includes, for example, at least one of a speaker, a light source, and a display device. When the notification device 15 receives a notification signal representing a predetermined notice to the driver from the ECU 16, the notification device 15 performs the notice to the driver by displaying a message or an icon on the display device, light emitting of the light source or a sound from the speaker. When the notification device 15 includes two or more types of devices, the notification may be made to the driver via each of the two or more types of devices.

The ECU 16 can control the vehicle 10 in accordance with the acceleration/deceleration control mode in which the acceleration/deceleration of the vehicle 10 is automatically controlled in accordance with a distance between the vehicle 10 and a preceding vehicle. The acceleration/deceleration control may be executed as one function of the driving support control or as one function of the autonomous driving control. That is, the driving support mode and the autonomous driving mode are examples of the acceleration/deceleration control mode.

The ECU 16 is an example of the display control device, and executes a predetermined notification corresponding to the state of the battery 13 via the notification device 15.

The ECU 16 includes a communication interface 21, a memory 22, and a processor 23. The communication interface 21, the memory 22, and the processor 23 may each be configured as separate circuits or may be integrally configured as a single integrated circuit.

The communication interface 21 includes interface circuitry for connecting the ECU 16 to other devices. The communication interface 21 passes a signal from the exterior sensor 14 to the processor 23. Further, the communication interface 21 outputs a control signal of the powertrain 11 received from the processor 23 to the powertrain 11. Furthermore, the communication interface 21 outputs, to the notification device 15, a notification signal indicating various types of notifications to the driver received from the processor 23.

The memory 22 is an example of a storage unit, and includes a volatile semiconductor memory and a non-volatile semiconductor memory. The memory 22 stores various types of data used in the display control process executed by the processor 23 or generated during executing the display control process. Further, the memory 22 stores various types of data that are used by the processor 23 in the control of the vehicle 10 according to the driving mode to be applied or that are generated during executing the control of the vehicle 10.

The processor 23 includes one or more central processing units (CPUs) and its peripheral circuitry. The processor 23 may further include other arithmetic circuits such as a logical operation unit, a numerical operation unit, or a graphics processing unit. Then, the processor 23 executes a display control process. Further, the processor 23 executes control of the vehicle 10 according to the driving mode to be applied.

FIG. 2 is a functional block diagram of the processor 23 for vehicle control processing related to display control processing and display control processing. The processor 23 includes a mode setting unit 31, a determination unit 32, a prediction unit 33, a condition setting unit 34, a notification processing unit 35, and a travel control unit 36. Each of these units included in the processor 23 is, for example, a functional module realized by a computer program running on the processor 23. Alternatively, each of these units may be a dedicated arithmetic circuit provided in the processor 23.

The mode setting unit 31 sets the driving mode to be applied to the vehicle 10 to a mode designated by an operation signal from an operation device (not shown) provided in the interior of the vehicle 10. That is, when the operation signal indicates that the driving mode including the acceleration/deceleration control (i.e., the driving support mode or the autonomous driving mode) is set, the mode setting unit 31 applies the driving mode to the vehicle 10. Further, when the operation signal indicates to set the manual driving mode indicating that manual driving is performed by the driver, the mode setting unit 31 applies the manual driving mode to the vehicle 10. Each time the driving mode to be applied to the vehicle 10 is changed through the operation of the operating device, the mode setting unit 31 notifies the prediction unit 33, the condition setting unit 34, and the travel control unit 36 of the changed driving mode.

The determination unit 32 receives a state signal indicating the state of the battery 13 from the battery 13 every predetermined period (for example, 1 second to several seconds), and determines whether or not the state of the battery 13 indicated by the state signal satisfies a predetermined limit condition. The state of the battery 13 is, for example, the state of charge (SOC) of the battery 13, the temperature of the battery 13, or both. The limit condition is a condition for determining whether or not to execute the notification of the output limit warning of the motor 12.

When the state of the battery 13 represented by the state signal is a charge state, the limit condition is defined by a threshold for the remaining amount of the battery 13 (hereinafter, referred to as a remaining amount threshold). In this case, the determination unit 32 determines that the limit condition is satisfied when the remaining amount of the battery 13 indicated by the charging state becomes equal to or smaller than the remaining amount threshold and determines that the limit condition is not satisfied when the remaining amount is larger than the remaining amount threshold.

When the state of the battery 13 represented by the state signal is the temperature of the battery 13, the limit condition is defined by a threshold with respect to the temperature of the battery 13 (hereinafter, referred to as a temperature threshold). In this case, the determination unit 32 determines that the limit condition is satisfied when the temperature of the battery 13 becomes equal to or higher than the temperature threshold and determines that the limit condition is not satisfied when the temperature is lower than the temperature threshold.

When both the state of charge and the temperature of the battery 13 are represented in the state signal, when the remaining amount of the battery 13 is equal to or lower than the remaining amount threshold or the temperature of the battery 13 is equal to or higher than the temperature threshold, the determination unit 32 may determine that the limit condition is satisfied.

The limit condition is set by the condition setting unit 34 based on the driving mode to be applied to the vehicle 10 or the prediction result by the prediction unit 33. Details of the setting of the limit condition will be described later.

Further, as will be described later, the limit condition in the case where the applied driving mode is the acceleration/deceleration control mode (i.e., the driving support mode or the autonomous driving mode) is set to a condition that is more strict than the limit condition in the case where the applied driving mode is the manual driving mode. Therefore, when the applied driving mode is the acceleration/deceleration control mode, the limit condition is less likely to be satisfied, and as a result, the output limit warning is less likely to be notified, as compared with the case where the applied driving mode is the manual driving mode.

Every time the determination unit 32 determines whether or not the limit condition is satisfied, the determination unit 32 notifies the notification processing unit 35 of the determination result.

Note that the above-described limit condition for determining whether or not to display the warning related to the output limit of the motor 12 may be different from a limit condition for determining whether or not to actually perform the output limit for the motor 12 (hereinafter, referred to as an output limit condition in order to distinguish from the limit condition related to the notification of the output limit warning). For example, the output limit condition is set to be more likely to be satisfied than the limit condition related to the notification of the output limit warning. Therefore, when the state of the battery 13 represented by the state signal is a charged state, the remaining amount threshold for the output limit condition is set to a value larger than the remaining amount threshold for the notification of the output limit warning. When the state of the battery 13 represented by the state signal is the temperature, the temperature threshold for the output limit condition is set to a value smaller than the temperature threshold for the notification of the output limit warning.

Every time the determination unit 32 determines whether or not the output limit condition is satisfied, the determination unit 32 notifies the travel control unit 36 of the determination result.

In a case where the driving support mode or the autonomous driving mode is applied to the vehicle 10, the prediction unit 33 determines whether or not a prediction condition in which the execution of the accelerator operation by the driver of the vehicle 10 is predicted is satisfied, based on the traveling state of another vehicle traveling around the vehicle 10, the distance between the other vehicle and the vehicle 10, or the behavior of the driver, for each predetermined period.

As the prediction condition, for example, the following four conditions are set. When any of the following conditions is satisfied, the prediction unit 33 determines that the prediction condition is satisfied, and when none of the conditions is satisfied, determines that the prediction condition is not satisfied. Note that the prediction condition is not limited to this, and other prediction conditions may be set, and any one of the following four conditions may be omitted.

(i) The distance between the vehicle 10 and the preceding vehicle traveling ahead of the vehicle 10 is equal to or larger than a predetermined distance (ii) The distance between the vehicle 10 and the following vehicle traveling behind the vehicle 10 is equal to or smaller than a predetermined distance (iii) The speed of the vehicle 10 is slower than the average speed of other vehicles traveling around the vehicle 10 (hereinafter, referred to as the speed of the traffic flow)

(iv) The vehicle 10 is traveling in a crusing lane and the driver turns on the turn signal on a passing lane side In order to detect the preceding vehicle, the prediction unit 33 detects another vehicle traveling around the vehicle 10. To this end, the prediction unit 33 detects another vehicle by inputting an exterior sensor signal, which is obtained by the exterior sensor 14 and represents a situation of a region around the vehicle 10, to a classifier trained in advance so as to detect another vehicle traveling around the vehicle 10. The classifier may be a deep neural network (DNN) based classifier having a convolutional neural network (CNN) type architecture or an attention mechanism.

When the exterior sensor 14 is a camera provided to photograph the surroundings of the vehicle 10 and the exterior sensor signal is an image, the classifier detects an object region in which another vehicle detected on the image is represented. Further, the prediction unit 33 detects the lane division line by inputting an image generated by the camera to the classifier for detecting the lane division line trained in advance so as to detect the lane division line. The classifier for lane division line detection may be a DNN for semantic segmentation, such as a U-net. Alternatively, the classifier for detecting other vehicles may be trained in advance to also detect a lane dividing line. Then, the prediction unit 33 sets, on the image, a region of the detected lane division lines sandwiched between the two lane division lines closest to the vehicle 10 as a host lane region representing the host lane in which the vehicle 10 is traveling. The prediction unit 33 may specify, as the preceding vehicle, the position of the bottom end of the object region on the image among the detected other vehicles included in the host lane region and closest to the lower end of the image. Alternatively, the prediction unit 33 may identify, as the preceding vehicle, the other vehicle located in an azimuth corresponding to the traveling direction of the vehicle 10 among the detected other vehicles. Then, the prediction unit 33 estimates the distance from the vehicle 10 to the preceding vehicle.

The position of the bottom end of the object region representing the preceding vehicle is assumed to represent the position at which the preceding vehicle is in contact with a road surface. The position on the image corresponds one-to-one to the direction viewed from the camera that generated the image. Therefore, the prediction unit 33 can estimate the distance and the azimuth from the camera to the preceding vehicle by referring to the position of the bottom end of the object region in which the preceding vehicle is represented on the image and parameters of the camera such as the installation height, the shooting direction, and the angle of view.

In a case where the exterior sensor 14 is a range sensor, the prediction unit 33 identifies, as the preceding vehicle, a vehicle detected in an azimuth corresponding to the traveling direction of the vehicle 10 among the detected other vehicles. Then, the prediction unit 33 may estimate the distance measured with respect to the azimuth in which the detected preceding vehicle is represented as the distance between the vehicle 10 and the preceding vehicle.

In addition, the prediction unit 33 sets the vehicle that is traveling in the host lane region behind the vehicle 10 among the detected other vehicles as the following vehicle. Then, the prediction unit 33 may execute the same processing as the estimation of the distance between the vehicle 10 and the preceding vehicle to estimate the distance between the vehicle 10 and the following vehicle.

Further, for each of the detected other vehicles, the prediction unit 33 may estimate the distance between the vehicle 10 and the other vehicle by executing the same processing as the estimation of the distance between the preceding vehicle and the vehicle 10. Further, for each of the detected other vehicles, the predicting unit 33 tracks the other vehicle by executing a tracking process such as Byte Track to calculate a change in the distance with respect to the traveling direction of the vehicle 10 in the latest predetermined period. Then, the predicting unit 33 calculates the average speed of each of the detected other vehicles in the latest predetermined period based on the average value of the speed of the vehicle 10 measured by the vehicle speed sensor (not shown) in the latest predetermined period and the change of the distance of each of the detected other vehicles, and calculates the speed of the traffic flow by averaging the average speed of each of the detected other vehicles.

When the distance to the preceding vehicle is equal to or more than the predetermined distance, there is a possibility that the accelerator is operated so that the vehicle 10 catches up with the preceding vehicle, and thus the prediction unit 33 determines that the prediction condition is satisfied.

Further, if the distance to the following vehicle is equal to or less than the predetermined distance, there is a possibility that the accelerator is operated so that the vehicle 10 is separated from the following vehicle, so that the prediction unit 33 determines that the prediction condition is satisfied. Even if the estimated distance to the following vehicle is equal to or less than the predetermined distance, when the distance between the vehicle 10 and the preceding vehicle is equal to or less than the predetermined distance, the vehicle 10 may get to close to the preceding vehicle when the vehicle 10 accelerates. Therefore, in such a case, the prediction unit 33 may determine that the prediction condition is not satisfied.

Further, when the average value of the speed of the vehicle 10 in the latest predetermined period is lower than the speed of the traffic flow by the predetermined speed or more, the driver may accelerate the vehicle 10 so as to bring the speed of the vehicle 10 close to the speed of the traffic flow. In such a case, the prediction unit 33 may determine that the prediction condition is satisfied.

Furthermore, the prediction unit 33 may specify the lane in which the vehicle 10 is traveling by referring to the map information and the position of the vehicle 10 determined by the receiver of the positioning system mounted on the vehicle 10. When the ECU 16 receives a signal from the turn signal indicating lighting of the turn signal on the passing lane side when the lane on which the vehicle 10 is traveling is a cruising lane, the driver may change the traveling lane of the vehicle 10 to the passing lane and accelerate the vehicle 10. In such a case as well, the prediction unit 33 may determine that the prediction condition is satisfied.

Every time the prediction unit 33 determines whether or not the prediction condition is satisfied, the prediction unit 33 notifies the condition setting unit 34 of the determination result.

The condition setting unit 34 sets a limit condition on the basis of the driving mode to be applied to the vehicle 10 or the determination result of whether or not the prediction condition is satisfied. In particular, when the prediction condition is not satisfied, the condition setting unit 34 sets the limit condition according to the driving mode to be applied to the vehicle 10. In the present embodiment, when the driving mode to be applied to the vehicle 10 is the manual driving mode, that is, when the acceleration/deceleration control mode is not applied, the condition setting unit 34 sets the limit condition to the first condition that is relatively relaxed. On the other hand, when the driving mode to be applied to the vehicle 10 is the driving support driving mode or the autonomous driving mode, that is, when the acceleration/deceleration control mode is applied, the condition setting unit 34 sets the limit condition to the second condition that is relatively strict. That is, the remaining amount threshold in the second condition is set to a value relatively lower than the remaining amount threshold in the first condition, and the temperature threshold in the second condition is set to a value relatively higher than the temperature threshold in the first condition. Therefore, the output limit warning is less likely to be notified when the second condition is set than when the limit condition is set to the first condition.

On the other hand, when the prediction condition is satisfied, the condition setting unit 34 sets the limit condition to the first condition regardless of the driving mode to be applied to the vehicle 10. Therefore, even if the driving mode to be applied to the vehicle 10 is the driving mode including the acceleration/deceleration control, the easiness of the notification regarding the output limit warning is the same as that when the manual driving mode is applied.

The condition setting unit 34 further sets the output limit condition based on the set limit condition. As described above, the output limit condition is set as a condition that is more likely to be satisfied than the limit condition related to the warning display. For example, the condition setting unit 34 sets a value that is about several percent of the remaining amount of the battery 13 higher than the remaining amount threshold set as the limit condition as the remaining amount threshold in the output limit condition. Further, the condition setting unit 34 sets a value several degrees lower than the temperature threshold set as the limit condition as the temperature threshold in the output limit condition.

Each time the limit condition and the output limit condition are set or changed, the condition setting unit 34 notifies the determination unit 32 of the limit condition and the output limit condition after the setting or the change.

When the determination unit 32 notifies that the limit condition is satisfied, the notification processing unit 35 notifies the driver of the output limit warning indicating that the output of the motor 12 is limited via the notification device 15. For example, when the limit condition is satisfied, the notification processing unit 35 causes the display device, which is an example of the notification device 15, to display a message or icon indicating the output limit warning. Alternatively, when the limit condition is satisfied, the notification processing unit 35 causes the light source corresponding to the output limit warning, which is another example of the notification device 15, to emit light or blink. Alternatively, when the limit condition is satisfied, the notification processing unit 35 causes the speaker, which is still another example of the notification device 15, to output a sound representing the output limit warning. Note that the notification processing unit 35 may notify the driver of the output limit warning via two or more types of notification devices 15.

When the determination unit 32 notifies that the limit condition is no longer satisfied, the notification processing unit 35 stops the notification of the output limit warning.

The travel control unit 36 controls the travel of the vehicle 10 in accordance with the applied driving mode.

When the manual driving mode is applied to the vehicle 10, the travel control unit 36 refers to a map representing the relationship between the pedal position of the accelerator device (not shown), the rotational speed of the engine or the motor 12 included in the powertrain 11, and the target torque. In accordance with the map, the travel control unit 36 sets the target torque in accordance with the accelerator pedal position corresponding to the depression amount of the accelerator pedal of the driver. However, when the output limit condition is satisfied, the travel control unit 36 corrects the target torque as necessary so that the request power of the motor 12 becomes equal to or less than the upper limit value under the output limit. The travel control unit 36 generates a control signal of the powertrain 11 in accordance with the target torque, and outputs the generated control signal to the powertrain 11. At this time, the travel control unit 36 may control the powertrain 11 such that the actually outputted torque approaches the target torque in accordance with the feedback control such as PID control. Further, when the driver depresses the brake pedal, the travel control unit 36 sets the target torque for decelerating the vehicle 10 in accordance with the amount of depression of the brake pedal by the driver, and controls the powertrain 11 including the brake device (not shown) and the motor 12 in accordance with the set target torque.

While the driving assistance mode or the autonomous driving mode is applied to the vehicle 10, the travel control unit 36 controls the powertrain 11 and the brake device so that the vehicle 10 travels at the target vehicle speed. Further, the travel control unit 36 controls the powertrain 11 and the brake device so that the distance between the vehicle 10 and the preceding vehicle traveling ahead of the vehicle 10 in the host lane in which the vehicle 10 is traveling is maintained at a predetermined distance or more. The target vehicle speed is set via an operation device in the vehicle. Alternatively, the travel control unit 36 may specify the road section in which the vehicle 10 is traveling on the basis of the map information representing the legal speed of each road section and the current position of the vehicle 10 to specify the legal speed of the road section, and set the target vehicle speed to the specified legal speed. Such map information is stored in advance in the memory 22 or a storage device (not shown) for storing the map information. The current position of the vehicle 10 may be determined by a receiver (not shown) of a satellite positioning system mounted on the vehicle 10.

The travel control unit 36 may execute the same process as that described in the prediction unit 33 to detect the preceding vehicle and estimate the distance between the vehicle 10 and the preceding vehicle. Alternatively, the travel control unit 36 may acquire the detection result of the preceding vehicle and the estimated value of the distance between the vehicle 10 and the preceding vehicle from the prediction unit 33.

When the estimated distance to the preceding vehicle (hereinafter, sometimes simply referred to as the inter-vehicle distance) is less than the predetermined distance, the travel control unit 36 sets the target speed/deceleration so as to decelerate the vehicle 10. At this time, the travel control unit 36 sets the target acceleration/deceleration so that the deceleration becomes larger as the inter-vehicle distance to the preceding vehicle is shorter or the relative speed of the vehicle 10 with respect to the preceding vehicle is faster. On the other hand, when the estimated inter-vehicle distance to the preceding vehicle is equal to or more than the predetermined distance, the travel control unit 36 sets the target acceleration/deceleration so that the speed of the vehicle 10 approaches the target vehicle speed. However, when the speed of the preceding vehicle is lower than the target vehicle speed, the travel control unit 36 sets the target acceleration/deceleration so that the inter-vehicle distance becomes the predetermined distance and the relative speed between the vehicle 10 and the preceding vehicle becomes zero. For this purpose, the travel control unit 36 sets the target acceleration/deceleration based on, for example, a relational expression between the inter-vehicle distance, the relative speed, and the target acceleration/deceleration. Then, the travel control unit 36 determines the target torque corresponding to the set target speed/deceleration. However, also in this case, when the output limit is satisfied, the travel control unit 36 corrects the target torque as necessary so that the request power of the motor 12 becomes equal to or lower than the upper limit value under the output limit. The travel control unit 36 generates a control signal of the powertrain 11 in accordance with the target torque, and outputs the generated control signal to the powertrain 11 including the motor 12 and the brake device.

Figure 3:
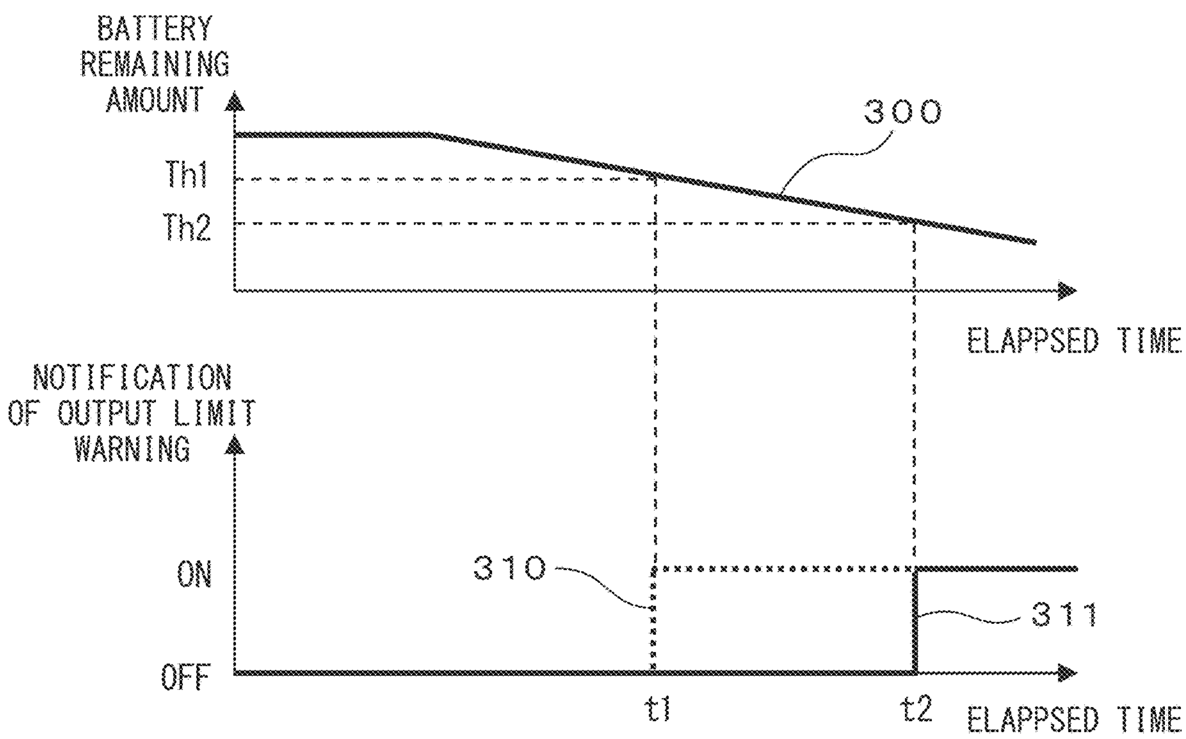
FIG. 3 is a schematic explanatory diagram of a display control process according to the present embodiment.

FIG. 3 is a schematic explanatory diagram of the display control process according to the present embodiment. In FIG. 3, the horizontal axis represents elapsed time. In the upper time chart, the vertical axis represents the remaining amount of the battery 13, and the graph 300 represents the time change of the remaining amount of the battery 13. In the lower time chart, the vertical axis represents the presence or absence of notification of an output limit warning. When the value of the vertical axis is ON, the output limit warning is notified, and when the value of the vertical axis is OFF, the output limit warning is not notified. The graph 310 represents the time change of the presence or absence of the output limit warning when the driving mode including the acceleration/deceleration control (i.e., the driving support mode or the autonomous driving mode) is not applied. In addition, the graph 311 represents the time change in the presence or absence of the output limit warning when the driving mode including acceleration/deceleration control is applied.

When the acceleration/deceleration control mode is not applied, the remaining amount threshold Th1 are set to be relatively large. On the other hand, as shown in the graph 300, the remaining amount of the battery 13 decreases over time, and becomes equal to or less than the remaining amount threshold Th1 at the time t1. Therefore, as shown in the graph 310, the output limit warning is notified after the time t1.

On the other hand, when the acceleration/deceleration control mode is applied, the remaining amount threshold Th2 is set to be relatively small. Therefore, as shown in the graph 300, the remaining amount of the battery 13 is equal to or less than the remaining amount threshold Th2 at the time t2 after the time t1. Therefore, as shown in the graph 311, the output limit warning is not notified at the time of the time t1, and the output limit warning is notified after the time t2. As described above, when the driving mode including acceleration/deceleration control is applied, the output limit warning is less likely to be notified than when the driving mode is not applied.

Figure 4:
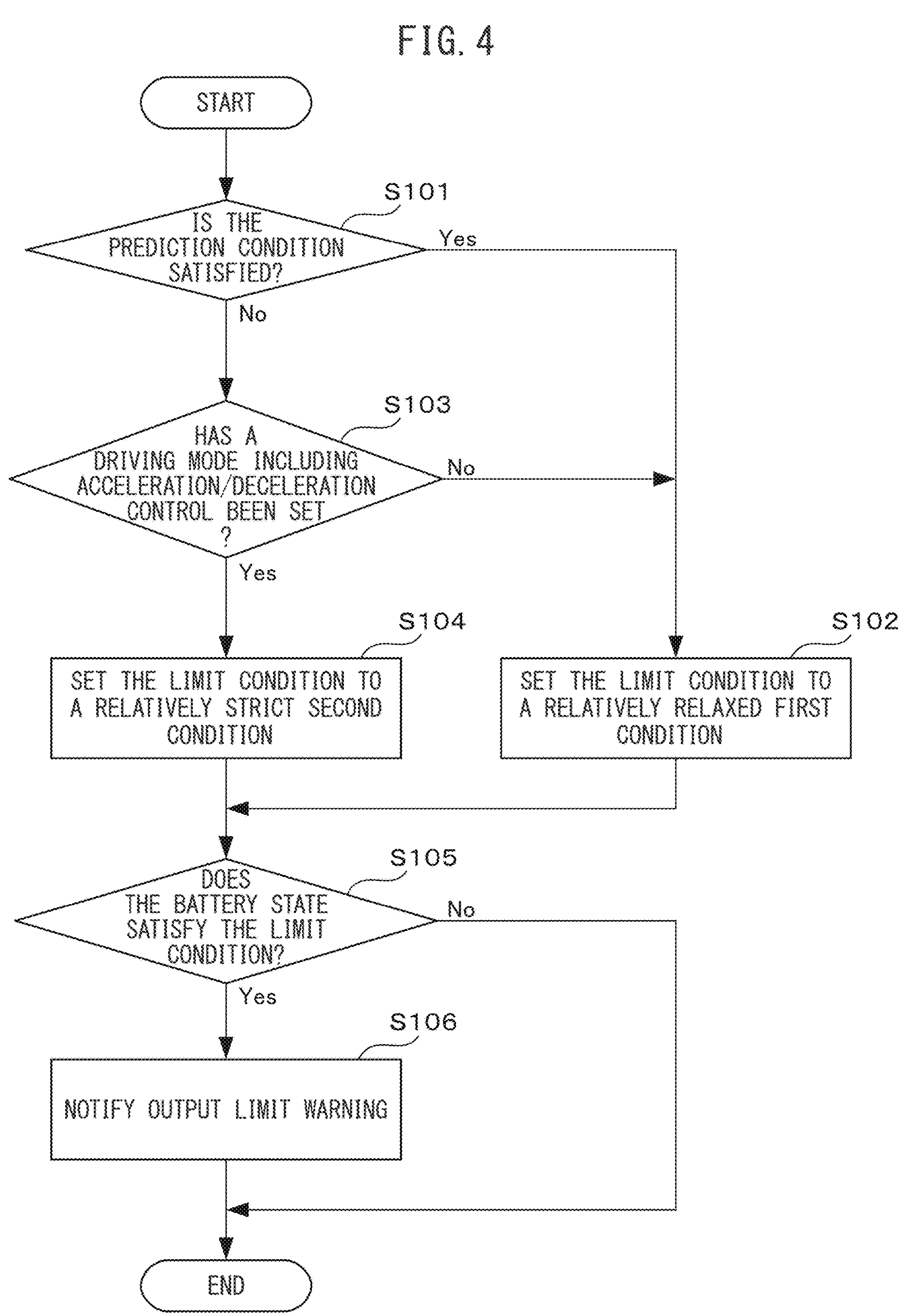
FIG. 4 is an operation flowchart of a display control process according to the present embodiment.

FIG. 4 is an operation flowchart of a display control process according to the present embodiment.

The prediction unit 33 determines whether or not the prediction condition in which the execution of the accelerator operation by the driver of the vehicle 10 is predicted is satisfied (step S101). When the predicted condition is satisfied (Yes in step S101), the condition setting unit 34 sets the limit condition to the first condition that is relatively relaxed (step S102). On the other hand, when the predicted condition is not satisfied (No in step S101), the condition setting unit 34 determines whether the applied driving mode is the driving mode including acceleration/deceleration control (step S103). When the applied driving mode is the driving mode that does not include the acceleration/deceleration control, that is, when the manual driving mode is applied (No in step S103), the condition setting unit 34 sets the limit condition to the first condition that is relatively relaxed (step S102). On the other hand, when the applied driving mode is the driving mode including the acceleration/deceleration control (i.e., the driving support mode or the autonomous driving mode) (Yes in step S103), the condition setting unit 34 sets the limit condition to the second condition that is more strict than the first condition (step S104).

After step S102 or S104, the determination unit 32 determines whether or not the state of the battery 13 satisfies the limit condition (step S105). When the limit condition is satisfied (Yes in step S105), the notification processing unit 35 notifies the driver of the output limit warning via the notification device 15 (step S106). When the limit condition is not satisfied in the step S105 (No in step S105), or after the step S106, the processor 23 ends the display control process.

As described above, when the state of the battery of the vehicle satisfies the limit condition, the display control device notifies the driver of the output limit warning of the motor via the notification device. Then, the display control device makes the limit condition in the case where the acceleration/deceleration control mode is applied more strict than the limit condition in the case where the acceleration/deceleration control mode is not applied. This makes it difficult to notify the output limit warning of the motor when the acceleration/deceleration control mode is applied, so that the display control device can reduce the frequency at which the driver is notified of anxiety. Further, when it is predicted that the driver performs the accelerator operation, even if the acceleration/deceleration control mode is applied, a relatively relaxed limit condition is set, so that the display control device can notify the driver of the output limit warning of the motor at an appropriate timing.

According to the modification, when the acceleration/deceleration control mode is applied to the vehicle 10, the condition setting unit 34 may set the limit condition to the second condition that is relatively strict regardless of whether or not the prediction condition related to the accelerator operation is satisfied. In this case, the processing of the prediction unit 33 may be omitted.

The computer program for realizing the functions of the processor 23 of the ECU 16 according to the above-described embodiment or each modification may be provided in a form recorded on a computer-readable portable recording medium such as a semiconductor memory, a magnetic recording medium, or an optical recording medium.

What is claimed is:

1. A display control device comprising:

a processor configured to:

determine whether or not a state of a battery of a vehicle satisfies a predetermined limit condition, notify a driver of the vehicle of an output limit warning in which output of a motor mounted on the vehicle is limited via a notification device mounted on the vehicle, when the state of the battery satisfies the limit condition, set the limit condition to a first condition when an acceleration/deceleration control mode for controlling acceleration/deceleration of the vehicle in accordance with a distance between a preceding vehicle and the vehicle is not applied, and set the limit condition to a second condition that is more strict than the first condition when the acceleration/deceleration control mode is applied.

2. The display control device according to claim 1, wherein the processor is further configured to determine whether or not a prediction condition in which execution of an accelerator operation by the driver is expected is satisfied based on a traveling state of another vehicle traveling around the vehicle, a distance between the other vehicle and the vehicle, or a behavior of the driver, wherein when the prediction condition is satisfied, the processor sets the limit condition to the first condition even when the acceleration/deceleration control mode is applied.

3. A display control method, comprising:

determining whether or not a state of a battery of a vehicle satisfies a predetermined limit condition;

notifying a driver of the vehicle of an output limit warning in which output of a motor mounted on the vehicle is limited via a notification device mounted on the vehicle, when the state of the battery satisfies the limit condition;

setting the limit condition to a first condition when an acceleration/deceleration control mode for controlling acceleration/deceleration of the vehicle in accordance with a distance between a preceding vehicle and the vehicle is not applied, and setting the limit condition to a second condition that is more strict than the first condition when the acceleration/deceleration control mode is applied.

4. A non-transitory recording medium that stores a display control computer program causing a processor mounted on a vehicle to execute a process comprising:

determining whether or not a state of a battery of the vehicle satisfies a predetermined limit condition;

notifying a driver of the vehicle of an output limit warning in which output of a motor mounted on the vehicle is limited via a notification device mounted on the vehicle, when the state of the battery satisfies the limit condition;

setting the limit condition to a first condition when an acceleration/deceleration control mode for controlling acceleration/deceleration of the vehicle in accordance with a distance between a preceding vehicle and the vehicle is not applied, and setting the limit condition to a second condition that is more strict than the first condition when the acceleration/deceleration control mode is applied.

* * * * *